Figure 1:
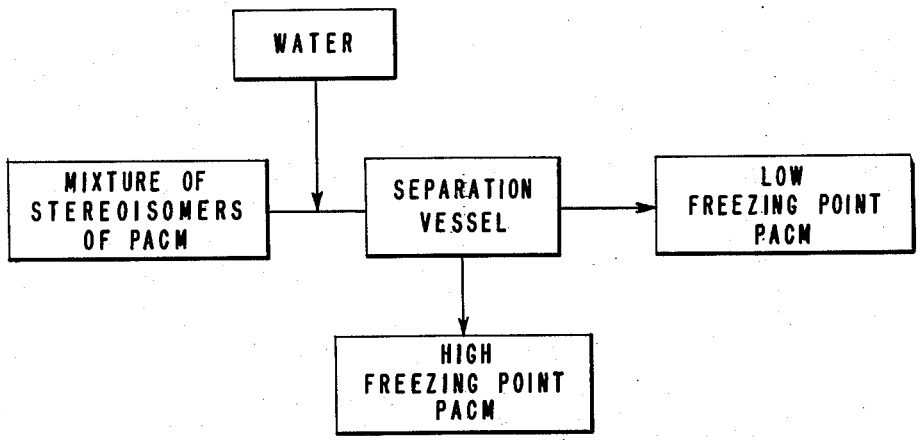

Oct. 13, 1964 W. J. ARTHUR 3,153,088
SELECTIVE ALTERATION OF THE RATIOS OF MIXTURES OF
BIS-(4-AMINOCYCLOHEXYL)METHANE ISOMERS
Filed Dec. 29, 1961

INVENTOR
WILFRED J. ARTHUR

BY *John E. Griffith*
ATTORNEY

United States Patent Office 3,153,088
Patented Oct. 13, 1964

3,153,088
SELECTIVE ALTERATION OF THE RATIOS OF MIXTURES OF BIS-(4-AMINOCYCLOHEXYL) METHANE ISOMERS
Wilfred J. Arthur, Charleston, W. Va., assignor to E. I. du Pont de Nemours and Company, Wilmington, Del., a corporation of Delaware
Filed Dec. 29, 1961, Ser. No. 163,325
8 Claims. (Cl. 260—563)

This invention relates to bis(4-aminocyclohexyl)methane. More particularly, it relates to a process for selectively altering the ratio of bis(4-aminocyclohexyl)methane isomers in a mixture of such isomers.

Various methods for the preparation of bis(p-aminocyclohexyl)methane, hereinafter called PACM, are known. PACM is known to exist in three stereoisomeric forms because of its structural configuration. These forms are the cis-cis, trans,trans, and the cis,trans isomers and mixtures of these result, for example, from the hydrogenation of di-(p-aminophenyl)methane. It is also known that particular selected conditions for such hydrogenation will favor the formation of different of these isomers in relatively predominating amounts.

However, prior to the present invention no one to my knowledge has been able to satisfactorily take a mixture of PACM isomers including both the cis,trans and the trans,trans isomers, and treat such mixtures to produce and recover selectively and controllably a high yield of either cis,trans PACM or trans,trans PACM, whichever was desired.

The economic value and technical importance of this invention will of course be apparent. It is now possible for the first time to recover from a mixture of PACM isomers, as desired, a product that is relatively rich in cis,trans PACM isomer and of special usefulness in the manufacture with certain dibasic acids such as adipic acid of polyamides having decreased softening points and characterized by clarity, transparency, toughness and stability above their fusion points.

This process thus makes possible not only a greater flexibility in the use of PACM products but also a tremendous financial savings in the use of PACM mixtures by recovery of products predominately rich in a desired component, and reuse of products rich in an undesired component.

The process of this invention comprises bringing together a mixture of PACM isomers, preferably in a suitable solvent, with a predetermined amount of water as fully explained below, and cooling the resulting composition whereby, depending on the amount of water used, either of two things takes place:

(1) Either a solid PACM product rich in the trans,trans isomer crystallizes out, leaving in the mother liquor a PACM product rich in the cis,trans isomer, and accompanied by the cis,cis isomer. The solid PACM product can be recovered by conventional techniques such as filtration or centrifugation. The liquid PACM product can if desired be recovered by heating the liquor to evaporate the solvent.

(2) Or, in the alternative, when a water immiscible solvent is employed two separate and distinct liquid phases result from the use of more than the critical amount of water, which amount is more fully defined below. The lower phase is rich in PACM; the upper phase is rich in solvent. The degree of separation of PACM from solvent is proportional to the excess of water used over and beyond the critical amount.

The process is schematically represented in FIGURE 1 of the accompanying drawing. With reference to the drawing, it will be understood that the high freezing PACM identifies the normally solid PACM rich in trans, trans isomer. This solid PACM isomeric mixture is known to have freezing points somewhere in the range from about 40° to 65.5° C. The low freezing PACM identifies the normally liquid PACM rich is cis,trans isomer, freezing point below about 40° C.

Referring to FIGURE 1, the three components (PACM isomer mixture, water and solvent) are brought together in solution in the separation vessel. The order of combining is not particularly critical although certain advantages in ease of handling, control, and yield are obtained when the isomer mixture is first dissolved in the solvent and the water then added to the resulting solution.

It will be understood that, depending on the ratio of isomers in the starting mixture, the dissolution in the solvent may require or be hastened by somewhat elevated temperatures, such as on the order of the normal boiling point of the system, or even higher if pressure is used, although no particular advantages are obtained by such high temperature operations. Admixing of the components can also be assisted by stirring or agitation as convenient.

Cooling of the properly prepared solution then effects formation of a well-defined liquid phase and a solid phase, each being PACM of different isomer content in admixture with water and if used some solvent. Slight cooling is sufficient, say, down to about room temperature for most solutions of PACM, water and a preferred solvent, but slightly greater yields of the solid phase can be obtained by cooling to a lower temperature, say 15° C.

The amount of water used in this process is the critical and important feature of this invention. It is indeed surprising that any benefit whatsoever is obtained by the addition of any water at all since it has always been believed in this art that anhydrous conditions were essential in PACM preparation and processing.

The use of even a very small amount of water effects a result according to this invention and no reason is seen for setting a lower limit as long as some water is used. As a practical matter, this is an amount of water of about 0.1% by weight based on the weight of the total starting PACM.

The upper limit of water to be employed in the application of this invention to the separation of PACM isomers from admixture is a unique function of (1) the solvent employed, (2) the ratio of solvent to PACM and (3) the trans,trans isomer content of the starting PACM mixture.

The following explanation will now be given so that person skilled in the art will readily understood how much water should be used in any given circumstance to obtain the desired result, whether such desired result is (1) or (2) above.

According to this invention, it has been found that for each given starting mixture of PACM isomers, for each solvent system employed, there is a determinable and critical amount of water. Since it is the primary aim to recover from the starting mixture a separated fraction which is relatively richer in normally solid high-freezing trans,trans rich PACM, an amount of water will be used which is equal to or less than the hereinafter critical amount.

The critical amount of water is readily ascertained experimentally for any particular system of solvent and PACM of known isomer ratio and is then a reproducible and repeatable function of those parameters. For sake of illustration, the procedure for determination of this critical amount of water is applied below to a given PACM mixture with a freezing point of about 44.0° C. representing a trans,trans isomer content of about 53%, a cis,trans isomer content of about 30% or more, and a cis,cis isomer content of about 7% or less.

(a) A number of solutions of different solvent concentration are made up with the starting PACM mixture, using any convenient solvent such is dibutyl ether or isopropyl ether. Let us say that 6 separate solutions are made up of solvent concentrations, respectively of 0.5, 0.6, 0.8, 1.0, 1.2 and 1.4 parts by weight of solvent per part by weight of total PACM in the given starting PACM mixture freezing at about 44.0° C.

(b) Each of these 6 solutions is now divided into a large number of separate portions and to each portion in a set of identical solvent concentrations is added a different amount of water until there is determined for that solvent concentration exactly what amount of water is the critical amount, i.e. below which crystalline PACM product forms on cooling and above which a distinct 2-phase liquid system results. This step is now repeated for each solution having a solvent concentration different from the first set, to determine the critical amount of water for the other concentrations of solvent. It will be understood that with some solvents such as dioxane or similar water-miscible solvent a separated liquid phase may not be obtained and determination of the critical amount of water will require separation and isomer analysis of the crystal fractions obtained from a series of tests as outlined above.

Figure 2:
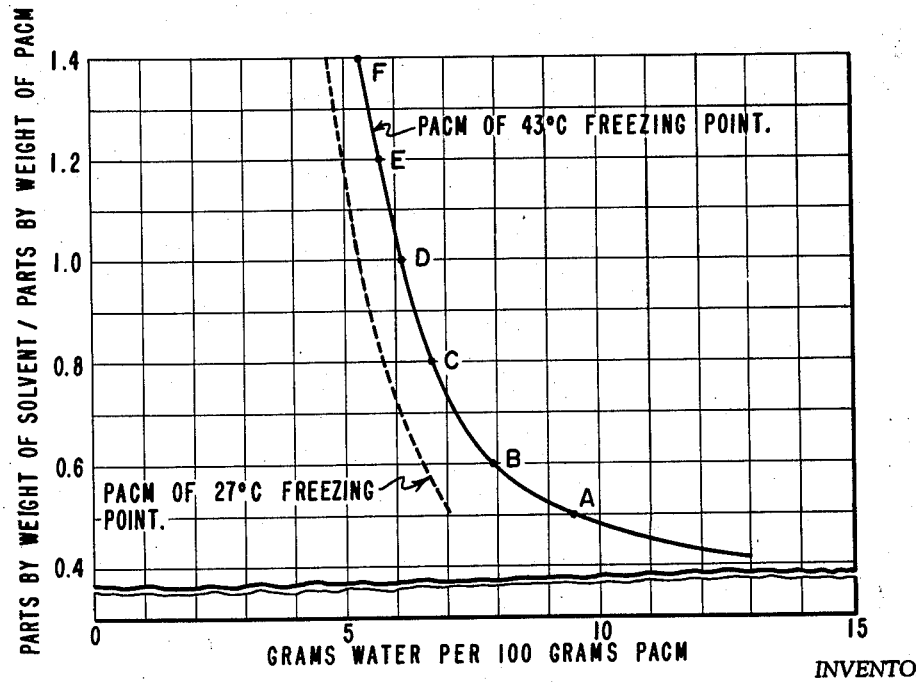

The results of step (b) can be shown conveniently on a graph, as shown in FIGURE 2 of the accompanying drawing. In FIGURE 2, the ordinate is a plot of parts by weight of solvent per part by weight of total PACM in the starting material. The abscissa is a plot of the percent water used based on the weight of PACM. The line ABCDEF represents the critical amount of water for the given PACM mixture in the particular solvent. Point A on the graph, for example, was obtained by taking a number of portions of solution containing 0.5 part of solvent per part of PACM and adding water until an amount was determined, above which the two liquid phases formed in the case of the water-immiscible solvents and below which the crystalline solid formed. The other points were similarly obtained.

As mentioned above, admixture of an amount of water to the left of the solid line curve on the graph of FIGURE 2 will, for a 44.0° C. freezing point PACM isomeric mixture, in solution in a water-immiscible solvent, effect on cooling of the solution formation of crystals of solid PACM product of a higher trans,trans content than the starting PACM mixture. By contrast, admixture of an amount of water to the right of the solid line curve will, for the same solution of the starting PACM mixture, effect formation of the two separate liquid phases, the top one of which is especially rich in the solvent.

Similarly, for other isomeric PACM mixtures other lines can readily be determined, such as for PACM having a freezing point of about 27° C., containing about 31% by weight trans,trans isomer and 58% cis,trans isomer as indicated by the dotted line on the graph of FIGURE 2.

In actual operation, it will normally be desired to produce as high a trans,trans isomer product as possible and as high a cis,trans isomer product as possible. It is therefore, preferred that practical operation will require operation as close as possible to the line of critical water content or addition amount on the lower side since it is true that, the further one goes from the line on the side of the less water addition (i.e., solid crystal formation and primarily trans,trans isomer recovery), the fewer crystals are formed.

It will be readily understood that the process of this invention can be advantageously carried out repetitively. For example, from an isomeric mixture of PACM having a freezing point of about 44° C. can readily be obtained a major amount of a mixture having a freezing point of 50° C. or 60° C. (relatively higher trans,trans content), and this can then readily be used according to the processes of this invention to obtain a major amount of a mixture having a freezing point as high as 65° C.

It will be apparent that the present invention is useful for dividing, as it were, a PACM of a certain isomeric ratio into two products, i.e. into a product of higher trans,trans content than the starting PACM, and a product of lower trans,trans content than the starting PACM, both in some admixture with water and the solvent if any employed.

It will, of course, be apparent that the multiplicity of products of this invention can be used as desired. It is only that, for the first time, it is now possible to controllably obtain predominating amounts, as desired, of either high melting or low melting PACM, from a starting PACM material of a fixed isomeric ratio.

Although this invention can be carried out using any mixture of PACM isomers, it is preferred that the starting mixture contain at least 20% by weight of the particularly desired isomer, i.e., either the cis,trans or the trans,trans isomer. Particularly outstanding results are obtained using a mixture comprising about 50 to 55% trans,trans, about 40 to 45% cis,trans, and about 0 to 6% cis,cis isomers.

The starting mixture of isomers can be prepared by any suitable means. Satisfactory methods are described, for example, in Kirk et al., U.S. Patent No. 2,944,563, issued January 17, 1950; Whitman, U.S. Patent No. 2,606,924, issued August 12, 1952; Whitman, U.S. Patent No. 2,606,925, issued August 12, 1952; and Barkdoll et al., U.S. Patent No. 2,606,928, issued August 12, 1952.

Solvents which can be used in the preparation of PACM are also useful in the process of the present invention. A large number of such solvents are known in the art and representative ones are disclosed for example in the aforementioned patents. Because of particularly improved yields of desired products and facility in process control, water-immiscible organic ether solvents are preferred. Suitable ethers include alkyl ethers of 3 to 10 carbons, such as diethyl ether, isopropyl ether, propyl ether, butyl ether, isobutyl ether, tertiary butyl ether, the amyl ethers, etc., dioxane, methyl ethyl ether, methyl propyl ether, ethyl propyl ether, ethylene glycol di-tertiary-butyl ether, etc., and amino substituted ethers, such as 1,2-di(3-aminopropoxy)ethane and the like. Particularly preferred solvents are isopropyl ether and n-butyl ether. Cyclohexylamine can also be used to advantage. Mixtures of solvents also will be useful.

This invention will be better understood by reference to the following illustrative examples:

*Example 1*

In a vessel designed for crystallization, and having a means of stirring and provision for heating and cooling the contents, is placed 113 grams of di-n-butyl ether and 103 grams of a PACM having a freezing point of 50.9° C. and containing 66% of the trans,trans isomer, about 30% of the cis,trans isomer and about 4% cis,cis isomer. This solution is heated to 60° C. and 6.3 grams of water added and the mixture stirred to effect complete solution. Upon cooling and stirring, crystallization begins at a solution temperature of about 49.5° C., and cooling is continued until the slurry temperature is 27° C. This grainy, crystalline slurry is centrifuged free of mother liquor while rinsing the centrifuge cake with about 50 grams of fresh solvent. The 85 grams of wet cake is charged to a simple still where it is distilled free of solvent and the PACM is taken overhead under vacuum. In addition to a small fraction containing both solvent and PACM and which may be recycled to an equivalent repeat of this process or otherwise recovered, a refined PACM fraction of 56 grams is obtained and is found to have a freezing point of 63.2° C. and to contain 94.0% trans,trans isomer and about 6% cis,trans isomer. A concurrent and unexpected advantage of this process is found to exist in the reduction of associated and relatively minor impurities. In this instance, for example, the total unsaturation, measured as a monophenyl compound via ultraviolet absorption, is found to decrease from 1000 parts per million parts in the starting material to 160 parts per million parts in the distilled solid phase fraction. The mother liquor along with the rinse liquor from the centrifugation is also charged to a simple still and freed of solvent before taking the PACM overhead under vacuum. A refined PACM fraction of 43 grams is obtained and found to have a freezing point of 23.5° C. and to contain about 32% trans,trans isomer, about 58% cis,trans isomer, and about 10% cis,cis isomer.

*Example 2*

Into a suitable crystallization vessel is charged 100 grams of di-isopropyl ether and 100 grams of a PACM having a freezing point of 44° C. and containing 54% trans,trans isomer, 39% cis,trans isomer, and 7% cis,cis isomer. The solution is heated to 55° C. and 7.3 grams of water is added while stirring vigorously to effect complete solution. This solution is cooled with stirring through crystallization inception at about 38° C. and on to 25° C., at which point the slurry is transferred to a suitable centrifuge where the crystals are readily separated from the mother liquor and are rinsed with 50 grams of fresh solvent. The 73 grams wet cake is charged to a simple still and the solvent removed and recovered prior to distillation of the PACM overhead under vacuum. The refined PACM thus obtained is 54 grams of material having a freezing point of 55° C. and containing about 75% trans,trans isomer, about 21% cis,trans isomer, and 4.0% cis,cis isomer. The mother liquor and rinses from the centrifugation are combined and distilled to remove and recover the solvent and the diamine is taken overhead under vacuum. The refined mother liquor PACM thus obtained is 35 grams having a freezing point of less than about 20° C.

*Example 3*

In the same equipment and under the general conditions detailed in Example 2, 100 grams of dioxane, 10 grams of water, and 100 grams of a PACM having a 44° C. freezing point and containing 54% trans,trans isomer is easily solubilized by stirring and warming to about 35° C. Crystallization is obtained suddenly when this solution is cooled to about 25° C. and it is cooled further to 20° C. prior to filtration on a simple one-plate pressure filter. The resulting filter cake is rinsed with 25 grams of di-oxane to displace the occluded mother liquor. The resulting 68 grams wet cake is distilled to remove and recover solvent, and the diamine is stripped overhead under vacuum. The resulting PACM is 32 grams having a freezing point of 57.6° C. and containing 80% trans,trans isomer. The combined mother liquor and rinses from the filtration step are distilled to remove and recover solvent and the PACM distilled overhead under vacuum to give 63 grams of material having a freezing point of 32° C. and containing about 39% trans,trans isomer.

*Example 4*

Into a suitable crystallization vessel is charged 220 grams of a solution of a 1.2:1 di-butyl ether:PACM, the PACM showing a freezing point of 44° C. and containing 54% trans,trans isomer, 39% cis,trans isomer and 7% cis,cis isomer. Water is added to the extent of 5.5 grams and solubilization is obtained by heating the mixture to 55° C., with stirring. Upon cooling the solution, crystallization begins at about 39° C. and cooling is continued until the crystal slurry is at 25° C. This slurry is transferred to a suitable centrifuge with the help of a minimum rinse of 4 grams of fresh solvent. The resulting 54 grams wet cake is distilled free of solvent and the diamine taken overhead under vacuum. This refined PACM fraction is 39 grams of material with a freezing point of 59.8° C. and containing about 86% trans,trans isomer, about 12% cis,trans isomer, and about 2% cis,cis isomer. The mother liquor resulting from the above centrifugation is distilled to remove and recover the solvent and the diamine taken overhead under vacuum. The distilled mother liquor PACM is 47 grams having a freezing point of about 23° C. and containing about 30% trans,trans isomer, about 59% cis,trans isomer, and about 11% cis,cis isomer.

*Example 5*

Utilizing the same equipment and general conditions, and the same quality of PACM as described in Example 4, but employing, instead, a dibutyl ether: PACM ratio of 0.90:1, 100 grams of starting diamine and 6.2 grams of water is found to produce 70 grams of wet cake upon centrifugation. Removal and recovery of the solvent is followed by distillation of the diamine overhead in vacuo to give 53 grams PACM with a freezing point of 56.2° C. and containing 77% trans,trans isomer. The mother liquor from this crystallization-centrifugation is freed of solvent by distillation and the diamine fraction is distilled overhead to give 36 grams of mother liquor PACM with a freezing point of less than 20° C. and containing about 27% trans,trans isomer, about 62% cis,trans isomer and about 11% cis,cis isomer.

*Example 6*

In the same manner as Example 5 and using the same diamine and ether and the same ratio, and under the conditions therein described, excepting only the use of 3.1 grams of water, a centrifuge wet cake of 46 grams is obtained. Removal and recovery of the solvent from this wet solid phase product is followed by vacuum distillation of the diamine overhead to give 35 grams of PACM having a freezing point of 60.5° C. and containing 87% trans-trans isomer, about 11% cis,trans isomer, and about 2% cis,cis isomer. The mother liquor is distilled separately to recover the solvent and then the diamine taken overhead in vacuo. The resulting 61 grams of mother liquor PACM has a freezing point of 29.7° C. and contains about 36% trans,trans isomer, about 54% cis,trans isomer, and about 10% cis,cis isomer.

*Example 7*

In a suitable crystallization vessel is placed 120 grams di-n-butyl ether, and 120 grams of a PACM having a freezing point of 27° C. and containing about 30% trans,trans isomer, about 59% cis,trans isomer and about 11% cis,cis isomer. This solution is heated to 55° C. and 6.6 grams water is added and completely solubilized with vigorous stirring. The resulting solution is cooled until a cloud of liquid droplets is obtained at 34° C. This separated liquid phase (which indicates use of an excess of water) becomes a crystalline solid phase upon further cooling, and this cooling is continued to 15° C. The crystaline slurry is filtered on a simple one-plate pressure filter and is thus separated into (1) 59 grams of mushy wet solids and (2) a mother liquor fraction, further treated separately. Distillation of the solids serves to remove the entrapped solvent and is continued under vacuum to bring the diamine overhead. This refined PACM fraction is 41 grams of material having a freezing point of 43.9° C. and containing 53% trans,trans isomer, about 40% cis,trans isomer, and about 7% cis,cis isomer. The mother liquor fraction (2) is charged to a simple distillation assembly and the solvent is removed and recovered, and the distillation is continued under vacuum to give an overhead diamine fraction of 69 grams shown to be PACM with a freezing point of less than 15° C., and containing about 17% trans,trans isomer, about 69% cis,trans isomer, and about 14% cis,cis isomer.

*Example 8*

In a manner and under the general conditions hereinbefore described is crystallized at a final temperature of 14° C. a solution consisting of 104 grams of dibutyl ether, 4.6 grams water, and 104 grams of a PACM having a freezing point of 21.8° C. and containing about 25% trans,trans isomer, about 63% cis,trans isomer, and about 12% cis,cis isomer. The resulting crystal slurry is filtered on a simple pressure filter and the resulting 48 grams of wet cake is distilled separately from the crystallization mother liquor. Taken overhead under vacuum the refined PACM is 32 grams of diamine having a freezing point of 48.6° C. and containing 62% trans,trans isomer, about 32% cis,trans isomer, and about 6% cis,cis isomer. Distillation of the mother liquor fraction from the crystallization results in 67 grams of a distillate found to be PACM with a freezing point below 10° C. and estimated to contain about 8% trans,trans isomer, about 77% cis,trans isomer, and about 15% cis,cis isomer.

*Example 9*

Into a suitable crystallization vessel is introduced at 70° C. 216 grams of a solution which contains 103 grams of dibutylether, 10.0 grams water, and 103 grams of a PACM having a freezing point of about 50.9° C., and containing about 66% trans,trans isomer, about 29% cis,trans and 5% cis,cis isomer. Upon cooling, a cloud of liquid droplets appears at about 68° C. and becomes a separated lower layer which is removed at 51° C. and held separate from the upper layer. Conventional distillation of this 84 grams lower liquid phase allows removal of the water and solvent, and PACM is then taken overhead under vacuum to give 53 grams of material with a 50.8° C. freezing point or substantially identical in quality to the starting diamine. Another 216 grams portion of the starting mixture is charged to the same crystallization assembly and is treated incrementally with additional portions of the starting mixture which had been distillation-dehydrated until no liquid phase separates upon cooling into the region of the freezing point of the PACM involved (i.e., 50 to 51° C.). About 61 grams of the water-free mixture is used, thus reducing the concentration of water in the system from 4.63% to about 3.75%, and normal separation of a crystalline solid phase now takes place through the interval 50° C. to 32° C., at which latter point the slurry is centrifuged to obtain 114 grams of an unrinsed wet cake. Distillation by conventional means allows ready removal and recovery of water and solvent and the PACM is taken overhead in vacuo as 83 grams of material having a freezing point of 59.9° C. and containing 86% trans,trans isomer, about 12% cis,trans isomer, and about 2% cis,cis isomer.

*Example 10*

In the manner hereinbefore described, a solution of 200 grams of di-n-butyl ether, 8.0 grams water, and 182 grams of a PACM mixture having a freezing point about 24.8° C. and containing about 29% trans,trans isomer, about 60% cis,trans isomer, and about 11% cis,cis isomer, is crystallized with stirring until the slurry temperature is about 16° C. Centrifugation without rinsing now produces 108 grams of a wet cake which is distilled free of solvent and water and the PACM taken overhead, in vacuo, to provide 66 grams with a freezing point of 46.8° C. and containing about 58% trans,trans isomer, about 36% cis, trans isomer, and about 6% cis,cis isomer. The mother liquor from the crystallization-centrifugation is similarly freed of solvent and water, and distilled overhead in vacuo to give 106 grams of PACM with a freezing point of 11.5° C. and containing about 11% trans,trans isomer, about 75% cis,trans isomer, and about 14% cis,cis isomer.

*Example 11*

Into a suitable crystallization vessel having means for efficient agitation is placed a mixture of 15 grams water and 150 grams of a PACM having a freezing point of 32° C. and containing about 36% trans,trans isomer, about 54% cis,trans isomer, and about 10% cis,cis isomer. This mixture is heated to about 60° C. and stirred vigorously to effect complete solution. The resulting solution is slowly cooled with stirring to obtain initial crystallization at about 32° C., followed by an autogenous rise in temperature to 34.5° C., and cooilng and crystallization is continued until the temperature is 30° C. The resulting slurry is transferred to a simple one-plate pressure filter and thereby separated into 89.7 grams solid phase and 73.1 grams liquid phase. Simple vacuum evaporation of the water without distillation of the PACM, results in 82 grams of "solid phase" having a melting point of 42° C. and containing about 50% trans,trans isomer, about 43% cis,trans isomer and about 7% cis,cis isomer. Vacuum evaporation removal of the water from the "liquid phase" results in 65 grams of PACM having a freezing point of about 11° C. and containing about 20% trans,trans isomer.

*Example 12*

Into a well agitated crystallization tank equipped with cooling means and containing a slurry or suspension of previously crystallized hydrate of bis(para-aminocyclohexyl)methane in dibutyl ether, which slurry is being continuously pumped from the bottom and recycled to the top of the tank, is pumped continuously, a homogeneous stream consisting of 0.358 pound of dibutyl ether, 0.597 pound of bis(para-aminocyclohexyl)methane having a trans,trans-stereoisomer content of 53%, and 0.045 pound of water per pound of solution. The flow of cooling medium is adjusted to remove heat from the crystallizer at about the same rate that it is being added with the feed and the average temperature of the contents is stabilized at about 30° C. From the circulating slurry loop there is taken as feed to a centrifuge a volume of slurry approximately equal to the volume of feed material being added to the crystallizer. Without rinsing of the crystals, a centrifuged wet cake of about 0.418 pound is obtained per pound of thoroughly mixed crystal slurry fed to the centrifuge and contains about 0.293 pound of bis(para-aminocyclohexyl)methane readily separable from the ether and water by vacuum distillation and containing about 78% of the trans,trans-stereoisomer. The centrifuge mother liquor consists of butyl ether, water and bis(para-aminocyclohexyl)methane rich in the cis, trans-stereoisomer, readily separable and recoverable by simple distillation under vacuum, if so desired.

*Example 13*

Into a suitable pressure vessel operating at 5000 pounds per square inch gage and 205° C. is charged 20 grams of a finely divided ruthenium-on-alumina catalyst, 80 grams para,para'-methylene dianiline, 20 grams $NH_3$, and 120 grams of a dibutyl ether solution containing 20% by weight of the mixed isomers of bis(para-aminocyclohexyl)methane in such proportion as to exhibit a solvent-free freezing point of 20° C. Essentially complete hydrogenation is obtained in about five minutes, and isomer equilibrium is substantially complete after an additional 15 minutes under the same conditions. The reaction product is cooled to about 140° C., depressured to remove substantially all the ammonia, and filtered to remove the catalyst. To this filtered crude product in a suitable stirred vessel at about 65° C. is added 6.1 grams water and when solution is complete the mixture is stirred and cooled to about 20° C. The crystal slurry thus obtained is centrifuged without rising to give a wet cake of 80 grams which is readily separated by simple distillation into 5 grams water, 21 grams dibutyl ether, and 54 grams of fully hydrogenated di(para-aminocyclohexyl)methane having a freezing point of 58.5° C. and containing 82% of the trans,trans isomer. The centrifuge mother liquor is composed of about 79 grams dibutyl ether, 1 gram water, and 48 grams of di(para-aminocyclohexyl)methane having a freezing point of 20° C., along with about 2 grams of hydrogenation by-products, and can be isomerized by injection into a batch or continuous hydrogenation reactor of the general nature herein described and reverted to the equilibrium isomer content, or it is suitable as a source of low freezing point di(para-aminocyclohexyl)methane by means of simple distillation under vacuum.

The foregoing detailed description has been given for clearness of understanding only and no unnecessary limitations are to be understood therefrom. The invention is not limited to the exact details shown and described, for obvious modifications will occur to those skilled in the art.

The invention claimed is:

1. The process for altering the ratio of bis(4-aminocyclohexyl)methane isomers comprising admixing water with a mixture of isomers of bis(p-aminocyclohexyl)methane to produce an aqueous mass, cooling said aqueous mass whereby two separate and distinct phases result, and separating by physical means said two phases.

2. The process as set forth in claim 1 wherein said physical means is evaporation.

3. The process as set forth in claim 1 wherein said physical means is filtration.

4. The process as set forth in claim 3 wherein the filter cake resulting from said filtration is further refined by distillation.

5. The process as set forth in claim 1 wherein said physical means is centrifugation.

6. The process as set forth in claim 5 wherein the centrifuge cake resulting from said centrifugation is further refined by distillation.

7. The process as set forth in claim 1 wherein said mixture is in solution in an inert organic solvent.

8. The process as set forth in claim 7 wherein said solvent is heated to aid dissolution at a temperature in the range from room temperature to the boiling point of the system at the pressure used.

References Cited in the file of this patent

UNITED STATES PATENTS 2,511,028    Whitman _____ June 13, 1950